US007487119B2

(12) United States Patent
Goto et al.

(10) Patent No.: US 7,487,119 B2
(45) Date of Patent: Feb. 3, 2009

(54) PHYSICAL DISTRIBUTION BUSINESS MANAGEMENT METHOD, PHYSICAL DISTRIBUTION BUSINESS MANAGEMENT SYSTEM, AND STORAGE MEDIUM

(75) Inventors: Mitsuyuki Goto, Tokyo (JP); Hisayuki Ogawa, Kanagawa (JP); Keisuke Sekiguchi, Kanagawa (JP); Seiji Kikumoto, Tokyo (JP); Eiichi Tezuka, Chiba (JP); Ichiro Kawahara, Shizuoka (JP); Tetsuya Oda, Tokyo (JP); Hirohiko Kimura, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 325 days.

(21) Appl. No.: 10/020,932

(22) Filed: Dec. 19, 2001

(65) Prior Publication Data

US 2002/0077915 A1 Jun. 20, 2002

(30) Foreign Application Priority Data

Dec. 20, 2000 (JP) ............................. 2000-387958

(51) Int. Cl.
 *G06G 1/00* (2006.01)
(52) U.S. Cl. .......................................... 705/28; 705/27
(58) Field of Classification Search .................. 705/26, 705/27, 28; 700/213
 See application file for complete search history.

(56) References Cited

U.S. PATENT DOCUMENTS

| 3,569,940 | A | * | 3/1971 | McFadden et al. ............. 700/80 |
| 4,264,808 | A | | 4/1981 | Owens et al. |
| 5,168,444 | A | * | 12/1992 | Cukor et al. .................... 705/1 |
| 5,475,851 | A | * | 12/1995 | Kodosky et al. ............. 715/763 |
| 5,602,936 | A | | 2/1997 | Green et al. |
| 5,910,896 | A | * | 6/1999 | Hahn-Carlson ............. 700/231 |
| 6,179,283 | B1 | * | 1/2001 | Gerstenberg et al. ........ 271/150 |

FOREIGN PATENT DOCUMENTS

| EP | 0 320 713 | 6/1989 |
| JP | 2000-148763 | 5/2000 |
| JP | 2000-284937 | 10/2000 |

OTHER PUBLICATIONS

Alonso, Marie Ranoia, Pure PDF:, Jun. 2000, Printing Impressions,, vol. 43, Iss 1 apge 40, 4 pages.*

(Continued)

*Primary Examiner*—Michael Cuff
(74) *Attorney, Agent, or Firm*—Oblon, Spivak, McClelland, Maier & Neustadt, P.C.

(57) ABSTRACT

Image data of a document generated by a key business terminal or a key business server is sent to a database management server, and this image data and the description contents of the document represented by this image data are stored to a freight tracking information database base. Image data and data of the description contents of the document stored in the freight tracking information database are viewed or searched by an authenticated operator who operates a user terminal. Image data representing the progress of transport of goods is sent to the user terminal from the database management server according to the operator's instruction, and an image represented by this image data is displayed by the user terminal.

21 Claims, 6 Drawing Sheets

OTHER PUBLICATIONS

Trunick, Perry A., "Keep an eye or your freight.", Transportation & Distribution, v30, n6, p. 20(4), Jun. 1989.*

Tetsuaki Yoneyama, "Latest Movement in Port Information System: Sea Nippon Automated Custom Clearance System (SEA-NACCS)", Logistics Information, vol. 44, No. 9, Sep. 1, 1997, pp. 4-10.

Akihiko Matsumoto, "Case Study: Automotive Part Trade Internet System EDI System/Industrial Bank of Japan—Sharing Progress Information of International Procurement Among Companies, The World's First", Network Computing, RIC Telecom, vol. 12, No. 1, Jan. 1, 2000, pp. 42-46.

* cited by examiner

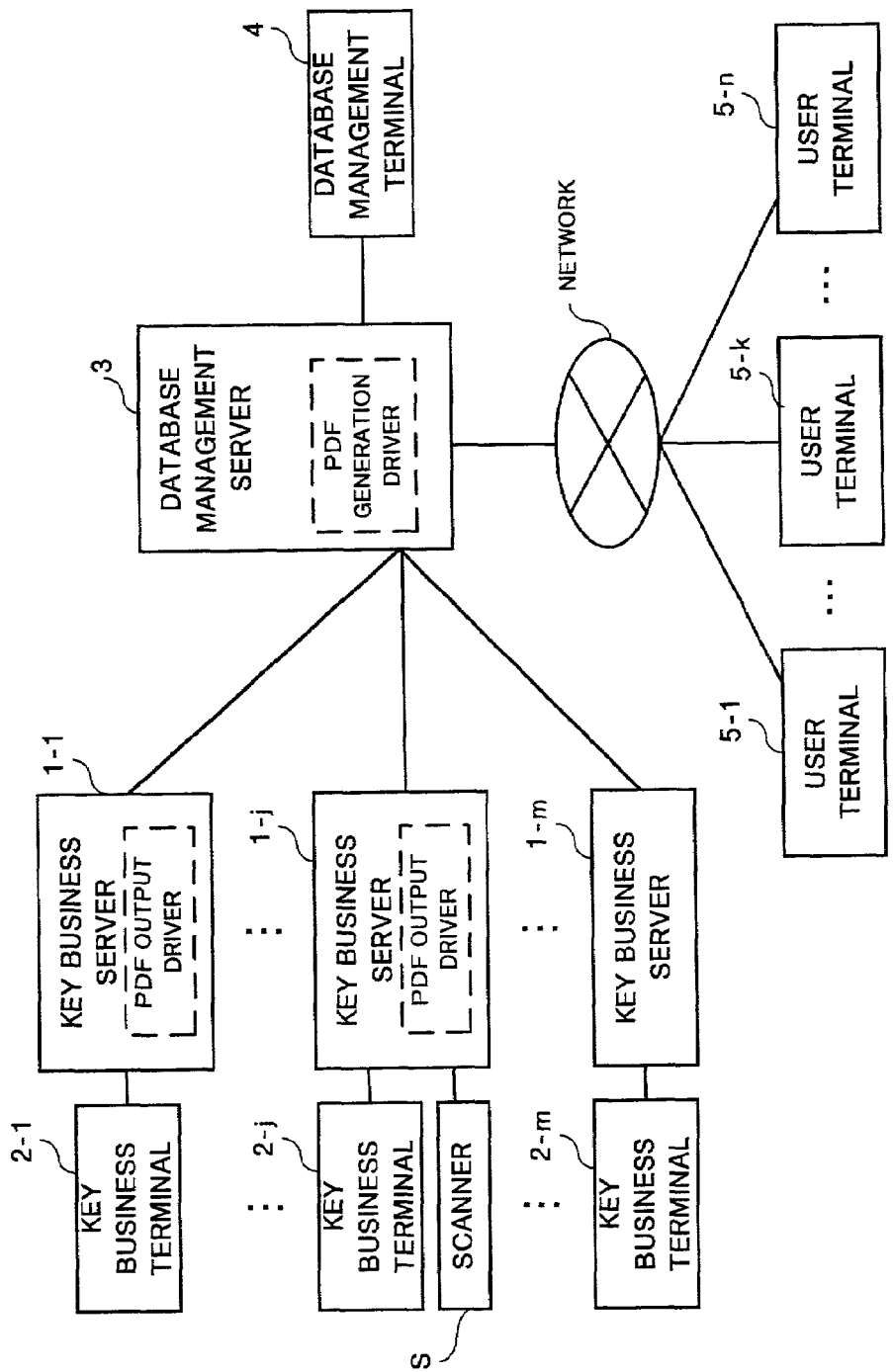

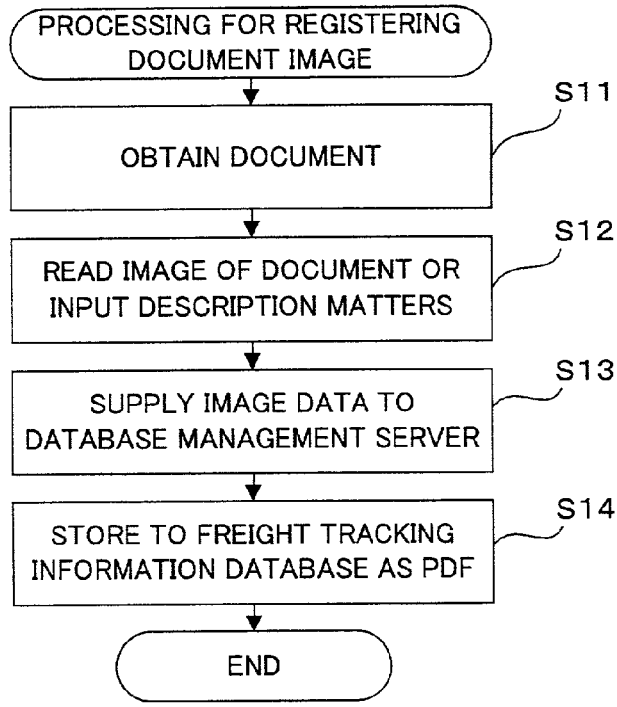
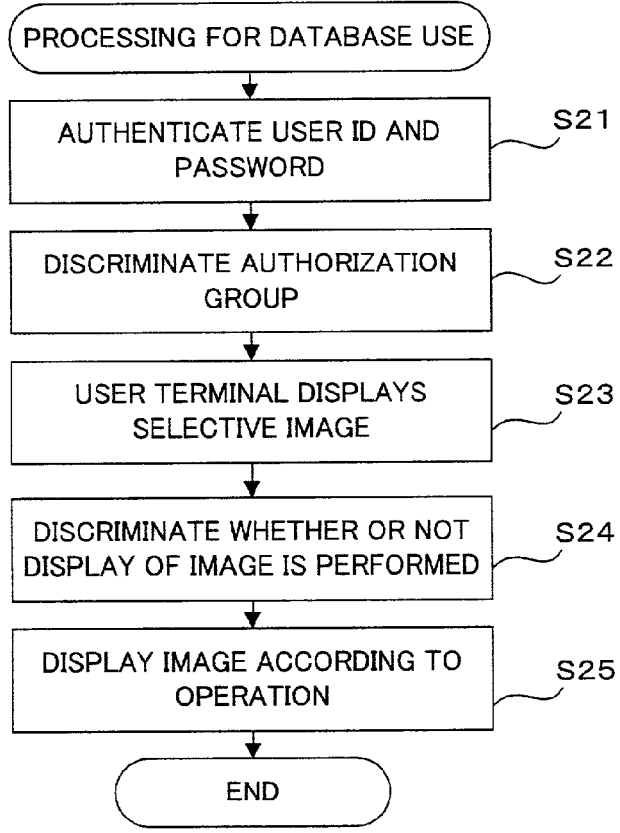

FIG. 4

ID  
PASSWORD  
LOGIN

FIG. 5

ORDER
- P/O AND ALLOCATION INFORMATION
- ORDER STATUS INFORMATION
- MORTGATE INFORMATION

SHIPMENT
- INVOICE INFORMATION

STORAGE
- STOCK INFORMATION

OUT OF STORAGE
- GOODS NUMBER INFORMATION
- CLP INFORMATION

NVOCC BISINESS
- SHIPPING ADVICE INFORMATION
- CFM INFORMATION

DOCUMENTS
- CUSTOMS DOCUMENT
- OVERSEAS SHIPMENT DOCUMENT
- COMBINED TRANSPORT DOCUMENT

FIG. 6

| ITEM | ALLOCATION | ORDERING COMPANY | BILL TO COMPANY | P/O NUMBER | TYPE OF ORDER | RECEIVED ALLOCATION |
|---|---|---|---|---|---|---|
| GO | GO | R_CHINA | R_CHINA | CHN2000900014 | REGULAR | 1 |
| GO | GO | R_CHINA | R_CHINA | CHN2000900014 | REGULAR | 1 |
| GO | GO | R_CHINA | R_CHINA | CHN2000900014 | REGULAR | 1 |
| GO | GO | R_CHINA | R_CHINA | CHN2000900014 | REGULAR | 1 |
| GO | GO | ...... | ...... | .......... | ....... | ..... |
| GO | GO | ...... | ...... | .......... | ....... | ..... |
| GO | GO | ...... | ...... | .......... | ....... | ..... |

FIG. 8

| SUM | GLOBAL EDP CODE | QUALITY GROUP | PRODUCT MONTH | AVAILABLE DATE | GLOBAL MODEL CODE | DESCRIPTION OF GOODS | AVAILABLE QUANTITY | FIXED AVAILABLE QUANTITY | STOCK QUANTITY | FIXED STOCK QUANTITY |
|---|---|---|---|---|---|---|---|---|---|---|
| GO | 208933 | 00 | 2000/09 | 2000/12/20 | A9890 | PAPER TRAY UNIT | 0 | 0 | 1 | 1 |
| GO | 208933 | 00 | 2000/09 | 2000/12/20 | A9890 | PAPER TRAY UNIT | 0 | 0 | 2 | 2 |
| GO | 208976 | 00 | 2000/07 | 2000/10/20 | A9892 | DSD78 | 0 | 0 | 1 | 1 |
| GO | ..... | ..... | ..... | ..... | ..... | ..... | ..... | ..... | ..... | ..... |
| GO | ..... | ..... | ..... | ..... | ..... | ..... | ..... | ..... | ..... | ..... |
| GO | ..... | ..... | ..... | ..... | ..... | ..... | ..... | ..... | ..... | ..... |
| GO | ..... | ..... | ..... | ..... | ..... | ..... | ..... | ..... | ..... | ..... |
| GO | ..... | ..... | ..... | ..... | ..... | ..... | ..... | ..... | ..... | ..... |

PHYSICAL DISTRIBUTION BUSINESS MANAGEMENT METHOD, PHYSICAL DISTRIBUTION BUSINESS MANAGEMENT SYSTEM, AND STORAGE MEDIUM

BACKGROUND OF THE INVENTION

1. Field of the Invention

The present invention relates to a physical distribution business management method for managing physical distribution business and a physical distribution business management system.

2. Description of the Related Art

In the case where a consignor transports (exports) goods to a consignee overseas the consignor places goods in a shipping agency's keeping, the consignor or shipping agency conducts a customs procedure, the shipping agency or an agency that is under contract to this shipping agency transports goods to the consignee. In addition to the consignor and consignee, the number of parties, who are concerned with exporting goods, for example, the shipping agency, the customs, increases. This also increases the number of documents used in the procedure for the delivery of goods between the respective parties concerned. For this reason, the documents used in the procedure became complicated, and this made it difficult for the party concerned to grasp the progress of the procedure relating to the transport of goods.

SUMMARY OF THE INVENTION

The present invention has been made in view of the foregoing circumstances, and an object of the present invention is to provide a physical distribution business management method that makes it easier to grasp the progress of the procedure relating to the transport of goods, a physical distribution business management system, and a storage medium.

In order to attain the above object, according to a first aspect of the present invention, there is provided a physical distribution business management method comprising an image data generation step for generating image data of a document on which a condition for exporting or importing goods is described; an image data storage step for storing image data generated in the image data generation step to be associated with the goods; a document data storage step for storing document data described on the document to be associated with the goods; an identification data storage step for storing identification data that identifies a party concerned with export or import of said goods; and a data output step, when said party concerned specifies data relating to goods, for obtaining data of goods stored to be associated with the corresponding specified data in said stored data to output said obtained data, wherein the identification data storage step decides a range of an output enable data to the party concerned based on stored identification data, and the data output step obtains data matching the decided range.

The document data storage step may store date data representing an execution date of procedures for exporting or importing the goods to be associated with the goods, and the data output step may specify a completed procedure of the procedures based on the date data and output data representing the corresponding specified procedure.

The data output step may display a diagram illustrating a correspondence between a person who conducts the specified procedure and a person who receives the procedure and outputs data representing the corresponding procedure.

The document data storage step may display image data stored in the image data storage step and store document data from the document displayed in the image data.

The image data generation step may read an image of the face of the document and generate the image data representing the read image, and the image data storage step may obtain the generated image data and store the obtained image data to be associated with the corresponding goods.

According to a second aspect of the present invention, there is provided a physical distribution business management system comprising image data generation means for generating image data of a document on which a condition for exporting or importing goods is described; image data storage means for storing image data generated by the image data generation means to be associated with the goods; document data storage means for storing document data described on the document to be associated with the goods; identification data storage means for storing identification data that identifies a party concerned with export or import of the goods; and data output means, when the party concerned specifies data relating to goods, for obtaining data of goods stored to be associated with the corresponding specified data in the stored data to output the obtained data, wherein the identification data storage means decides a range of an output enable data to the party concerned based on stored identification data, and the data output means obtains data matching the decided range.

The document data storage means may store date data representing an execution date of procedures for exporting or importing the goods to be associated with the goods, and the data output means may specify a completed procedure of the procedures based on the date data and output data representing the corresponding specified procedure.

The data output means may display a diagram illustrating a correspondence between a person who conducts the specified procedure and a person who receives the procedure and output data representing the corresponding procedure.

The document data storage means may display image data stored by the image data storage means and store document data from the document displayed in the image data.

The image data generation means may read an image of the face of the document and generate the image data representing the read image, and the image data storage means may obtain the generated image data and store the obtained image data to be associated with the corresponding goods.

According to a third aspect of the present invention, there is provided a computer-readable storage medium having a computer-program recorded thereon, the computer program causing a computer to perform functions of image data generation means for generating image data of a document on which a condition for exporting or importing goods is described; image data storage means for storing image data generated by the image data generation means to be associated with the goods; document data storage means for storing document data described on the document to be associated with the goods; identification data storage means for storing identification data that identifies a party concerned with export or import of the goods to decide a range of an output enable data to the party concerned based on stored identification data; and data output means, when the party concerned specifies data relating to goods, for obtaining data of goods, which is stored to be associated with the corresponding specified data in the stored data and which matches the decided range, to output the obtained data.

BRIEF DESCRIPTION OF THE DRAWINGS

These objects and other objects and advantages of the present invention will become more apparent upon reading of the following detailed description and the accompanying drawings in which:

FIG. 1 is a block diagram illustrating a structure of a freight tracking information management system according to an embodiment of the present invention;

FIG. 2 is a flowchart showing processing for document image registration;

FIG. 3 is a flowchart showing processing for database use;

FIG. 4 is a view schematically illustrating a login image;

FIG. 5 is a view schematically illustrating a selective image;

FIG. 6 is a view schematically illustrating an allocation information display image;

FIG. 8 is a view schematically illustrating a stock display image.

DETAILED DESCRIPTION OF THE PREFERRED EMBODIMENT

Figure 7:
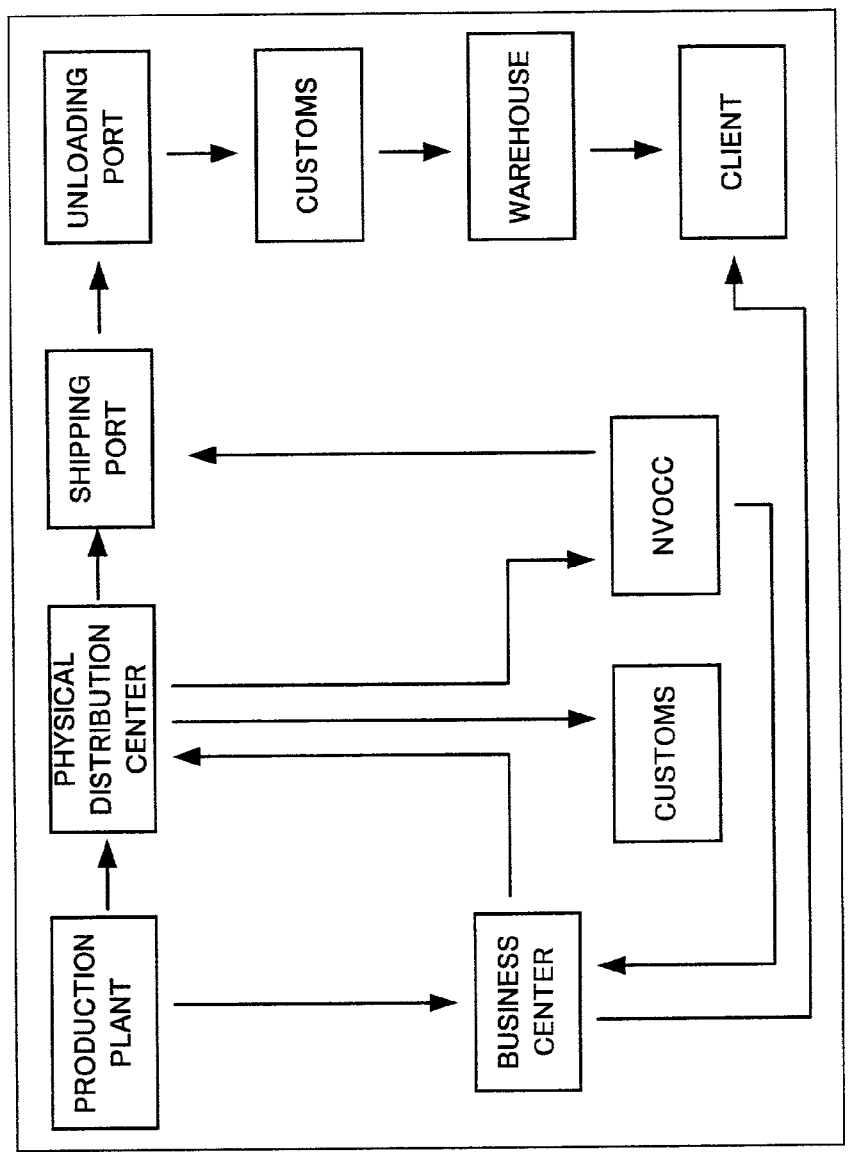
FIG. 7 is a view illustrating a status in which information relating to goods are transmitted to the parties concerned.

The following will explain a physical distribution business management method, a physical distribution business management system and a storage medium according to an embodiment of the present invention taking a freight tracking information management system for grasping the status of transport of exported goods as an example.

FIG. 1 is a block diagram illustrating the structure of the freight tracking information management system according to the embodiment of the present invention. As illustrated in FIG. 1, the freight tracking information management system is composed of key business servers 1-1 to 1-m (m represents the sum total number of key business servers), key business terminals 2-1 to 2-m, a database management server 3, a database management terminal 4, and user terminals 5-1 to 5-n (n represents the sum total number of user terminals).

The key business servers 1-1 to 1-m are connected to the key business terminals 2-1 to 2-m via a LAN (Local Area Network) and the like, respectively. The key business servers 1-1 to 1-m are connected to the database management server 3 via a private communications line and the like. The database management terminal 4 is connected to the database management server 3 via LAN and the like. The user terminals 5-1 to 5-n are connected to the database management server 3 via an external network such as the Internet.

The key business servers 1-1 to 1-m are composed of a server computer and the like, respectively. The key business servers 1-1 to 1-m obtain data supplied from the key business terminals 2 and execute processing for document image registration to be described later, respectively.

A scanner S is connected to at least any one of the key business servers 1-1 to 1-m. In this example, the scanner S is connected to a key business server 1-j (j represents an arbitrary integer, which is from one to m inclusive).

A PDF (Portable Document Format) output driver is stored in at least any one of the key business servers 1-1 to 1-m. The key business server that stores the PDF output driver executes the PDF output driver to generate image data described in a PDF format in processing for document image registration.

Such key business servers 1-1 to 1-m are placed at locations handling the exported goods or information relating to the exported goods. Then, the key business servers 1-1 to 1-m perform processing for information that is handled at the location where they are placed, respectively. Such locations include, for example, a production plant for exported goods, a business center that manages a production schedule for exported goods, a physical distribution center that keeps the stock of exported goods, the customs, address of NVOCC (transportation company using overseas shipping) or a shipping company, a shipping port where exported goods are shipped, an unloading port where exported goods are unloaded, and address of the consignee.

It is assumed that the user of the freight tracking information management system signs a contract with a manager of the freight tracking information management system to handle PDF-formatted image data as being substantially identical with the original document indicated by the corresponding image data. Then, it is supposed that the manager of the freight tracking information management system operates based on the presence of this contract as a precondition.

Moreover, in the freight tracking information management system, a security setting for protecting against tampering, such as a read-only setting and the like is provided to the PDF-formatted image data that the freight tracking information management system generates.

The key business terminals 2-1 to 2-m comprises an input device composed of a keyboard and a mouse, and a personal computer having a display device composed of a liquid crystal display and the like. Then, information input by the operator of key business terminals 2-1 to 2-m using the input device is provided to the key business servers 1-1 to 1-m connected via LAN or the like.

The database management sever 3 is composed of a server computer and the like. The database management server 3 executes processing for document image registration with the key business server 1-j and the key business terminal 2-j. Moreover, the database management sever 3 executes processing for database construction to be described later with the database management terminal 4. Still moreover, the database management sever 3 executes processing for database use to be described later with the user terminal 5.

Still moreover, in the database management server 3, a freight tracking information database, a WWW (World Wide Web) server program, and a CGI (Common Gate Interface) for managing database are stored.

The freight tracking information database is a database that registers information relating to the freight which this freight tracking information management system undertakes the transportation. More specifically, in the freight tracking information database, for example, data indicated in the following (a) and (b) is stored to be associated with each other.

(a) Image data representing the faces of various kinds of documents relating to the freight; and (b) Data described in the faces indicated by image data of (a);

The documents indicated by image data of (a) includes, for example, documents (a1) to (a15) given below:

(a1) Commercial Invoice;
(a2) Packing List
(a3) Goods Number List (List of identification number assigned to goods)
(a4) B/L (Bill of Landing), Consignment Note
(a5) CLP (Container Load Plan)
(a6) CFM (Container Freight Manifest)
(a7) Container Stacking Plan
(a8) Various Document for Customs (a9) P/O (Purchase Order)
(a10) S/O (Shipping Order)
(a11) S/I (Shipping Instructions)
(a12) D/O (Delivery Order)
(a13) E/L (Export License)
(a14) Stock List
(a15) Shipping Advice These documents can be classified into documents for customs ((a1), (a2), (a8)), overseas shipment documents ((a1) to (a6)), combined transport documents ((a4) to (a6)), and other shipping related document ((a7)).

Data of (b) includes, for example, documents (b1) to (b56)) given below:

(b1) Code for identifying P/O
(b2) Receipt date of P/O indicated by data of (b1)
(b3) Name of a person who orders goods using P/O indicated by data of (b1) (or designation or other data identifying the person)
(b4) Name of a person who bears the shipping cost of goods ordered using P/O indicated by data of (b1)
(b5) Code for identifying S/0 that provides an order to ship goods ordered using P/O indicated by data of (b1)
(b6) Code for identifying S/I that provides instructions to ship goods ordered using P/O indicated by data of (b1)
(b7) Issue date of S/I indicated by data of (b6)
(b8) Name of a ship instructed to ship using S/I indicated by data (b6)
(b9) Data representing a shipping port for the ship instructed to ship using S/I indicated by data (b6)
(b10) Data representing an unloading port for the ship instructed to ship using S/I indicated by data (b6)
(b11) Unload date of goods instructed to ship using S/I indicated by data (b6)
(b12) Name of goods instructed to ship using S/I indicated by data (b6)
(b13) Supplier of goods indicated by data of (b12)
(b14) Quantity of ordered goods indicated by data of (b12)
(b15) Quantity of goods, indicated by data of (b12), planed to be manufactured
(b16) Quantity of manufactured goods indicated by data of (b12)
(b17) Quantity of shipped goods indicated by data of (b12)
(b18) Goods number assigned to goods indicated by data (b12)
(b19) EDP (Electronic Data Processing) code assigned to goods indicated by data (b12)
(b20) Code for identifying the commercial invoice of goods indicated by data (b12)
(b21) Contents of the commercial invoice indicated by data (b12)
(b22) Container number assigned to a container on which goods, indicated by data (b12), are loaded
(b23) Weight of the container indicated by data (b22)
(b24) Load factor of the contain indicated by data (b22)
(b25) Case number assigned to a case loaded on the container indicated by data (b22)
(b26) Weight of the case indicated by data (b25)
(b27) Load factor of the case indicated by data (b25)
(b28) Code for identifying B/L
(b29) Contents of B/L indicated by data of (b28)
(b30) Code for identifying Shipping Advice
(31) Contents of Shipping Advice indicated by data of (b30)
(b32) Scheduled date for issuing D/O and issue date of D/O
(b33) Scheduled date for packing and date which packing was performed
(b34) Scheduled date for vanning (loading onto the container) and date which vanning was performed
(b35) Scheduled date for starting up to carry to the shipping port and start-up date of carrying
(b36) Scheduled date for ending to carry to the shipping port and end date of carrying
(b37) Scheduled date for starting up the customs procedure and start-up date of the customs procedure
(b38) Scheduled date for receiving a resultant report of the customs procedure and date that the resultant report was received
(b39) Scheduled date for obtaining E/L and E/L obtaining date
(b40) Scheduled date for shipment work and shipment work executing date
(b41) Scheduled date for sailing and sailing date
(b42) Scheduled date for arriving in port
(b43) Scheduled date for issuing B/L indicated by data of (b28) and issue date of B/L
(b44) Scheduled date for shipping B/L and the like and shipping date of B/L and the like
(b45) Addressee of goods ordered to ship by S/O indicated by data of (b5)
(b46) Carrier who carries goods ordered to ship by S/O indicated by data of (b5)
(b47) Name of goods ordered to ship by S/O indicated by data of (b5)
(b48) Supplier of goods indicated by data of (b47)
(b49) Quantity of ordered goods indicated by data of (b47)
(b50) Quantity of goods, indicated by data of (b47), planed to be manufactured
(b51) Quantity of manufactured goods indicated by data of (b47)
(b52) Quantity of shipped goods indicated by data of (b47)
(b53) Goods number assigned to goods indicated by data (b47)
(b54) EDP code of goods indicated by data (b47)
(b55) Code for identifying the commercial invoice of goods indicated by data (b47)
(b56) Contents of the commercial invoice indicated by data (b47)

It should be noted that data of (b12) to (b20) might be used as data of (b47) to (b56).

Moreover, in the freight tracking information database, data indicated as (c1) to (c4) shown below is stored to be associated with one another.

(c1) User's name of the freight tracking information management system, address, and e-mail address
(c2) ID (Identification Code) assigned to the user indicated by data of (c1)
(c3) Password assigned to the user indicated by data of (c1)
(c4) Data indicating an authorization group to which the user indicated by data of (c1) belongs Here, the authorization group indicated by data of (c4) can be classified into the following eight kinds (A) to (H).

(A) System manager (person who manages this freight tracking information management system)
(B) Operation manager (person who is authorized to gain access to data that this freight tracking information management system holds in conformity with the system manager)
(C) Export business user (person who is authorized to gain access to data other than the combined transport document)
(D) Combined transport business user (person who is authorized to gain access to data other than the overseas shipment document)

(E) Intra-company general user (person who is authorized to gain access to data excepting the combined transport document, customs document, and overseas shipment document)

(F) Consignor user (person, who is authorized to gain access to data relating to goods of which the user oneself is the consignee)

(G) Client user (person, who is authorized to gain access to data relating to goods of which the user oneself is the consignor)

(H) Combined transport cooperation company user (person who is authorized to gain access to data relating to the combined transport document)

Moreover, in the freight tracking information database, data indicated as (d1) to (d3) shown below is stored to be associated with one another.

(d1) Goods number to be exported and EDP code (d2) Amount of change in the stock of goods indicated by data of (d1)

(d3) Day that the change in the stock indicated by data of (d2) occurred

The WWW server program is a program for causing the database management server 3 to perform processing of WWW server. When a URL (Uniform Resource Locator) indicating a logical location of data is supplied to the database management server 3, the database management server 3 that executes the WWW server program reads data, which is placed at the logical position indicated by this URL, from a storage area of storage that the database management server 3 has or the storage area where the database management server 3 is accessible, and sends back read data to the supply source of this URL.

The database management CGI is a program for causing the database management server 3 and user terminal 5 to perform processing for database use. When URL indicating the database management CGI is supplied to the database management server 3 from the user terminal 5, processing for database use is executed by the database management server 3 in accordance with control the WWW server program.

Furthermore, as illustrated in FIG. 1, the database management server 3 stores a PDF generation driver. The PDF generation driver converts image data, which is not in a PDF format, to PDF-formatted image data in processing for document screen page registration.

The database management terminal 4 comprises an information processing device of a personal computer having an input device composed of a keyboard and a mouse and a display device composed of a liquid crystal display and the like. Then, information input by the operator of the database management terminal 4 is provided to the database management server 3 connected via LAN and the like so as to execute processing for database construction.

The user terminal 5 comprises an information processing device of a personal computer having an input device composed of a keyboard and a mouse and a display device composed of a liquid crystal display and the like.

The user terminal 5, for example, user terminal 5-k (k represents an arbitrary integer, which is from one to n inclusive) executes processing for WWW browser. Namely, when the user inputs URL, the user terminal 5-k gains access to a device (for example, database management server 3) accessible to the logical position indicated by the corresponding URL and requests the device to transmit data being placed at the logical position indicated by the URL. Then, the user terminal 5-k receives data transmitted by this device in response to this request and displays an image shown by received data.

Then, the user terminal 5k executes processing for database management server 3 and database use when supplying URL for database management CGI to the database management server 3.

(Operation)

An explanation will be next given of an operation of this freight tracking information management system. In this example, the operation of freight tracking information management system will be explained according to processing for document image registration, processing for database construction and processing for database use.

(Processing for Document Image Registration)

The processing for document image registration is processing that registers a document image to the freight tracking information database. FIG. 2 is a flowchart showing processing for document image registration.

In the physical distribution steps that constitute the procedure of export, the parties concerned with the procedure of export prepare or receive a document relating to a physical distribution process as a result obtained by executing the physical distribution step with which each party is concerned (step S11 in FIG. 2). At this time, they register the image of this document (namely, the forgoing data of (a)) to this freight tracking information management system.

More specifically, the operator, who is the party concerned with the procedure of export, sets this document to the scanner S connected to the key business server 1-j. Next, the operator operates the key business terminal 2-j and sends a command to the key business server 1-j so as to instruct the scanner S to scan an image. The key business server 1-j scans the image on the face of the document set to the scanner S connected to the key business server 1-j in response to this instruction and generates image data representing the read image (step S12).

The documents to be scanned by the scanner S are P/O and the like if the key business server 1-j to which the scanner S is connected is located at the production plant. Moreover, if it is located at the business center, the documents are, for example, commercial invoice, S/I and the like. If it is located at the physical distribution center, the documents are, for example, packing list, goods number, stock list, and the like. If it is located at NVOCC or the shipping company, the documents, for example, S/O, B/L, or consignment note, D/O, and CLP. Moreover, if the key business server 1-j is located at the customs, the documents are, for example, E/L and various kinds of customs documents. If it is located at the shipping port, the documents are, for example, CFM, container stacking plan, and shipping advice.

The operator of key business terminal 2-j operates the input device of key business terminal 2-j and inputs data that specifies which one of the foregoing data of (a1) to (a15) this image data forms, so that the kind of document is specified. Resultantly, the key business terminal 2-j supplies data indicating the kind of image data specified by the operator to the key business server 1-j as data to be added to image data.

When image data indicating the image scanned by the scanner S and data indicating the kinds of image are supplied to the key business server 1-j from the key business terminal 2-j, the key business server 1-j adds data indicating the kind of image to image data and stores image data temporarily.

At this time, the operator can operate the input device of the key business terminal 2-j without scanning the image by use of scanner S. Namely, the operator can instruct the input device of the key business terminal 2-j to input data specifying the kind of document and description matters of the kind of document indicated by the corresponding data and generate image data indicating the image of the corresponding document in which the input description matters are described. In this case, the key business terminal 2-j generates image data that indicates the image of the corresponding document in which the description matters input by the operator is described in response to this instruction (step S12). The key business terminal 2-j adds data, which indicates the kind of document specified by the operator, to image data generated based on the description matters input by the operator, and supplies it to the key business server 1-j. When the corresponding image data is supplied from the key business terminal 2-j, the key business server 1-j stores this image data temporarily.

In the case where the key business server 1-j stores the PDF output driver, the key business server 1-j executes the PDF output driver so as to convert image data temporarily stored by the processing for document image registration to data described in the PDF format. Then, the key business server 1-j supplies PDF-formatted image data to the database management server 3 in, for example, a fixed cycle (step S13).

On the other hand, in the case where the key business server 1-j does not store the PDF output driver, the key business server 1-j supplies image data temporarily stored to the database management server 3 (step S13).

When image data is supplied from the key business server 1-j, the database management server 3 stores this image data temporarily. Then, the database management server 3 gains access to the key business server 1-j and determines whether or not image data, which is temporarily stored by the database management server 3, substantially matches image data, which is temporarily stored by the key business server 1-j.

Then, when determining that both match each other, the database management server 3 stores image data temporarily stored to the freight tracking information database as data of (a) (step S14). Here, in the case where the corresponding data is not one that is described in the PDF format, the database management server 3 executes the PDF generation driver so as to convert the corresponding image data, which is stored by the database management server 3, to data described in the PDF format. Then, the database management server 3 stores the PDF-formatted image data obtained by conversion to the freight tracking information database.

On the other hand, when determining that both do not match each other, the database management server 3 obtains one of data, which the key business server 1-j stores temporarily and which the database management server 3 does not temporarily store, from the key business server 1-j, and stores it temporarily. Thereafter, the database management server 3 stores image data temporarily stored by the server 3 to the freight tracking information database as data of (a) (step S14). Similarly, in this case, if the corresponding data is not one that is described in the PDF format, the database management server 3 executes the PDF generation driver so as to convert the corresponding image data, which is stored by the database management server 3, to data described in the PDF format. Then, the database management server 3 stores the PDF-formatted image data obtained by conversion to the freight tracking information database.

(Processing for Database Construction)

The processing for database construction is processing in which data (data of (b)), which is described on the face of the document indicated by data of (a), is registered to the freight tracking information database having data of (a) registered by the processing or document image registration so as to construct the freight tracking information database.

First, the operator of the database management terminal 4 (manager of the freight tracking information system and the like) operates the input device of database management terminal 4 and instructs the input device of database management terminal 4 to specify data of (a) indicating the document to which data of (b) is not stored yet.

The database management terminal 4 gains access to the database management server 3 in response to this instruction. Then, the database management terminal 4 searches the freight tracking information database stored in the database management server 3 and specifies one of data of (a), which is stored in the freight tracking information database and which is not yet associated with other data. Then, the database management terminal 4 lists the names of specified data of (a) on the display screen page of the display device that the terminal 4 has.

Next, the operator of the database management terminal 4 operates the database management terminal 4, inputs at least one of the names listed, and instructs the database management terminal 4 to display the image of the document indicated by data of (a) having the input name.

The database management terminal 4 gains access to the database management server 3 in response to this instruction, and reads one of data of (a), which is stored in the freight tracking information database and which has the name input by the operator. Then, the database management terminal 4 displays the image indicating read data of (a).

Sequentially, the operator of the database management terminal 4 inputs description matters that form any of data of (b1) to (b56) among the description matters as visually identifying the description matters included in the image of document displayed by the database management terminal 4. Then, the operator instructs the database management terminal 4 to store the input description matters to the freight tracking information database.

The database management terminal 4 stores these description matters input by the operator to the freight tracking information database as data of (b) in accordance with this instruction.

Additionally, the operator of the database management terminal 4 may input data corresponding to any of data of (b1) to (b56) without displaying the image of document on the database management terminal 4. Similarly, in this case, when the operator instructs the database management terminal 4 to store the input description matters to the freight tracking information database, the operator instructs the database management terminal 4 stores these data input by the operator to the freight tracking information database as data of (b) in accordance with this instruction.

(Processing for Database Use)

The processing for database use is processing for grasping the progress of the procedure relating to the transport of freight by use of the constructed freight tracking information database.

First, an explanation will be given of a user registration that is performed so that the user uses the freight tracking information database.

The user operates the input device of user terminal 5-k to display user registration image (not shown) for performing the user registration on the display screen page of the display device that the user terminal 5k has. Next, the user inputs data of (c1) including user's name, address and e-mail address, and instructs the user terminal 5-k to register it to the freight tracking information database as data of (c1). The user terminal 5-k supplies data of (c1) to the database management server 3.

The database management server 3 registers supplied data to the freight tracking information database and assigns user ID (data of (c2)) and user password (data of (c3)) and supplies them to the user terminal 5-k. The user terminal 5-k displays supplied data of (c2) and data of (c3) on the display device that the user terminal 5-k has. Moreover, the database management server 3 registers data of (c4) of any one of the authorization groups to which the user belongs to the freight tracking information database from data of (c1).

An explanation will be next given of the processing for database use.

The user operates the input device of user terminal 5-k and inputs URL of the database management CGI. Then, the user instructs the user terminal 5-k to gain access to the database management server 3. When the user terminal 5-k gains access to the database management server 3, the database management server 3 executes the database management CGI. Resultantly, the database management server 3 and user terminal 5-k perform the processing for database use explained below. FIG. 3 is a flowchart showing processing for database use.

When the database management CGI is started up, the database management server 3 generates data indicating the login image for performing authentication of user and supplies it to the user terminal 5-k. In response to the fact that the database management server 3 has supplied this data, the user terminal 5-k displays the login image indicated by data supplied to the terminal 5-k on the display screen page of the display device that the terminal 5-k has.

The login image includes an ID entry field for entering a user ID, a password entry field for entering a user password, and a transmission button ("login") for instructing the supply of the entered ID and password to the database management server 3 as illustrated in FIG. 4.

Then, the user operates the input device of user terminal 5-k, inputs ID to the ID entry field and the password to the password entry field, and clicks the "login." At this time, the user terminal 5-k supplies the ID entered to the ID entry field and the password entered to the password entry field to the database management server 3.

The database management server 3 performs authentication of ID and password supplied from the user terminal 5-k (step S21 in FIG. 3).

The database management server 3 determines whether or not ID and password supplied from the user terminal 5-k are stored to the freight tracking information database to be associated with each other. When determining that ID and password are not stored in the freight tracking information database (they are not authenticated), the database management server 3 notifies the user terminal 5-k that the use of database is rejected. In response to this notification, the user terminal 5-k displays a message indicating that the use of database is rejected.

On the other hand, when determining that ID and password are stored in the freight tracking information database (they are authenticated), the database management server 3 reads data (data of (c4)), which is associated with the authenticated ID and password and which indicates that the authorization group to which the user belongs. Then, the database management server 3 determines the authentication group indicated by the read data of (c4) (step S22).

Next, the database management server 3 causes the user terminal 5-k to display a selective image for deciding a display image (step S23). The selective image includes a plurality of link destination names to which hyperlinks are added as illustrated in FIG. 5. These link destination names are associated with any of the respective items 20 including, for example, "order", "shipment", "storage", "out of storage", "NVOCC (transportation company using overseas shipping)", and "documents."

Among these items, the link destination name associated with the "order" includes, for example, "P/O and allocation information", "order status information" and "mortgage information."

In the link destination name, "P/O and allocation information", there is provided a hyperlink for displaying an allocation information search image to be described later. In the link destination name, "order status information", there is provided a hyperlink for displaying an order status search image to be described later. In the link destination name, "mortgage information", there is provided a hyperlink for displaying mortgage search image to be described later.

The link destination name associated with the "shipment" includes, for example, "invoice information."

In the link destination name "Invoice information", there is provided a hyperlink for displaying invoice information search image to be described later.

The link destination name associated with the "storage" includes, for example, "stock information."

In the link destination name "stock information", there is provided a hyperlink for displaying stock search image to be described later.

The link destination name associated with the "out of storage" includes, for example, "goods number information" and "CLP information."

In the link destination name "goods number information", there is provided a hyperlink for displaying goods number search image to be described later. In the link destination name "CLP information", there is provided a hyperlink for displaying CLP search image to be described later.

The link destination name associated with the "NVOCC business" includes, for example, "shipping advice information" and "CFM information."

In the link destination name "shipping advice information", there is provided a hyperlink for displaying shipping advice search image to be described later. In the link destination name "CFM information", there is provided a hyperlink for displaying CFM search image to be described later.

The link destination name associated with the "document" includes, for example, "customs document", "overseas shipment document" and "combined transport document."

In the link destination name "customs document", there is provided a hyperlink for displaying customs document link image to be described later. In the link destination name "overseas shipment document", there is provided a hyperlink for displaying overseas shipment document link image to be described later. In the link destination name "combined transport document", there is provided a hyperlink for displaying combined transport document link image to be described later.

Then, when the user operates the input device of the user terminal 5-k and clicks any of link destination names, the user terminal 5-k supplies information indicating the clicked link destination name to the database management server 3. The database management server 3 decides whether or not the user terminal 5-k is caused to display the corresponding image depending on which image the link destination name indicated by this information is associated with (step S24). In the case where the database management server 3 decides that the user terminal 5-k is caused to display the corresponding image, the image that complies with the operation done by the operator is displayed on the display screen page of the display device of the user terminal 5-k (step S25).

For example, in the case where the clicked link destination name is "P/O and allocation information", the database management server 3 determines whether or not the authorization group determined in step S22 is a combined transport cooperation company user (H). Namely, this is because the combined transport cooperation company user (H) is a person who is authorized to gain access to data relating to the combined transport document, and only user authorization group (H) has no authorization to gain access to P/O and allocation information.

When determining that the authorization group is (H), the database management server 3 decides that no display of allocation information display image is performed, and causes the user terminal 5-k to display the selective image.

On the other hand, when determining that the authorization group is not (H), the database management server 3 generates data indicating an allocation information search image and causes the user terminal 5-k to display the allocation information search image.

The allocation information search image has a search key entry field, serving as a search key, for inputting a month on which goods are shipped and a search button for instructing the database management server 3 to start the search.

For example, the user operates the input device of user terminal 5-k, inputs the month on which goods are shipped to the search key entry field of allocation information search image and clicks the search button. At this time, the user terminal 5-k supplies data indicating the month input to the search key entry field to the database management server 3 and instructs the database management server 3 to perform the search.

The database management server 3 that has received this instruction searches the freight tracking information database and specifies the day, which belongs to the month supplied from the user terminal 5-k, as a scheduled date for sailing among data of (b41). Then, the database management server 3 reads data of (b1), (b3) and (b4) associated with specified data of (b41). After that, the database management server 3 generates data representing the allocation information display image in which read data is listed every data associated with the same data of (b41), and supplies generated data to the user terminal 5-k. The user terminal 5-k displays the allocation information display image (for example, image illustrated in FIG. 6) indicated by this data.

In this case, if the user authorization group is a consignor user (F), the following point is not added as data to be listed. Namely, the point is that data of (b45) associated with the corresponding data does not indicate the authenticated user (user indicated by data of (c1) associated with authenticated ID) in specified data of (b41) and data associated with this data. This is because the consignor user is a person, who is authorized to gain access to data relating to goods of which the user oneself is the consignee.

Moreover, if the authorization group of the authenticated user is a client user (G), the following point is not added as data to be listed. Namely, the point is that data of (b3) associated with the corresponding data does not indicate the authenticated user in specified data of (b41) and data associated with this data. This is because the client user is a person, who is authorized to gain access to data relating to goods of which the user oneself is the consignor.

Additionally, the allocation information display image further includes an item information display button, which is brought into a one-to-one correspondence with listed data of (b1), and an allocation display button, which is brought into a one-to-one correspondence with listed data of (b1) as illustrated in FIG. 6.

Regarding data that represents the allocation information display image, for example, data that describes the corresponding allocation information display image in HTML (HyperText Markup Language) may be used.

Then, when the user operates the input device of user terminal 5-k and clicks the item information display button, the user terminal 5-k supplies data, indicating with which one of data of (b1) the clicked item information display button is associated, to the database management server 3.

The database management server 3 to which this data has been supplied reads data of (b19), (b12), (b14) to (b17) and (b2). After that, the database management server 3 generates data representing the image in which read data is listed every data about the same data, and supplies generated data to the user terminal 5-k. The user terminal 5-k displays the image indicated by this data.

Moreover, when the user operates the input device of user terminal 5-k and clicks the allocation display button, the user terminal 5-k supplies data, indicating with which one of data of (b1) the clicked allocation display button is associated, to the database management server 3.

The database management server 3 to which this data has been supplied reads data of (b5) and (b45) associated with data of (b1) indicated by this data. After that, the database management server 3 generates data representing the image in which read data is listed every data about the same S/O, and supplies generated data to the user terminal 5-k. The user terminal 5-k displays the image indicated by this data. Additionally, this image includes an item information display button by S/O, which is brought into a one-to-one correspondence with listed data of (b5).

Then, when the user operates the input device of user terminal 5-k and clicks the item information display button by S/O, the user terminal 5-k supplies data, indicating with which one of data of (b5) the clicked item information display button by S/O is associated, to the database management server 3.

The database management server 3 to which this data has been supplied reads data of (b13) to (b17) and (b19) associated with data of (b5) indicated by this data. After that, the database management server 3 generates data representing the image in which read data is listed every data about the same goods, and supplies generated data to the user terminal 5-k. The user terminal 5-k displays the image indicated by this data.

In the case where the clicked link destination name is "order status information", the database management server 3 determines whether or not the authorization group to which the authenticated user belongs is a combined transport cooperation company user (H), similar to the case in which the clicked link destination name is "P/O and allocation information."

When determining that the authorization group is (H), the database management server 3 decides that no display of order status display image is performed, and causes the user terminal 5-k to display the selective image.

On the other hand, when determining that the authorization group is not (H), the database management server 3 generates data indicating an order status search image and causes the user terminal 5-k to display the order status search image.

The order status search image has a search key entry field, serving as a search key, for inputting a month on which goods are shipped and a search button for instructing the database management server 3 to start the search.

Then, the user operates the input device of user terminal 5-k, inputs the month on which goods are shipped to the search key entry field of the order status search image and clicks the search button. At this time, the user terminal 5-k supplies data indicating the month input to the search key entry field to the database management server 3 and instructs the database management server 3 to perform the search.

The database management server 3 that has received this instruction searches the freight tracking information database and specifies the day, which belongs to the month supplied from the user terminal 5-k, as a scheduled date for sailing among data of (b41). Then, the database management server 3 reads data of (b1), (b3), (b4) and (b45) associated with specified data of (b41). After that, the database management server 3 generates data representing the order status search display image in which read data is listed every data associated with the same data of (b41), and supplies generated data to the user terminal 5-k. The user terminal 5-k displays the order status search display image indicated by this data. Additionally, the order status search display image includes a shipping information display button, which is brought into a one-to-one correspondence with listed data of (b1).

In this case, if the authorization group of the authenticated user is (F), the following point is not added as data to be listed. Namely, the point is that data of (b45) associated with the corresponding data does not indicate the authenticated user in specified data of (b41) and data associated with this data.

Moreover, if the authorization group of the authenticated user is (G), the following point is not added as data to be listed. Namely, the point is that data of (b3) associated with the corresponding data does not indicate the authenticated user in specified data of (b41) and data associated with this data.

Then, when the user operates the input device of user terminal 5-k and clicks the shipping information display button, the user terminal 5-k supplies data, indicating with which one of data of (b1) the clicked shipping information display button is associated, to the database management server 3.

The database management server 3 to which this data has been supplied reads data of (b7) to (b11) associated with data of (b1) indicated by this data. After that, the database management server 3 generates data representing the image in which read data is listed every data about the same S/I, and supplies generated data to the user terminal 5-k. The user terminal 5-k displays the image indicated by this data. Additionally, this image includes an order status display button by S/I, which is brought into a one-to-one correspondence with listed data of (b7).

Then, when the user operates the input device of user terminal 5-k and clicks the order status display button by S/I, the user terminal 5-k supplies data, indicating with which one of data of (b7) the clicked order status display button by S/I is associated, to the database management server 3.

The database management server 3 to which this data has been supplied reads data of (b12), (b14) to (b20) and (b5) associated with data of (b7) indicated by this data. After that, the database management server 3 generates data representing the image in which read data is listed every data about the same goods, and supplies generated data to the user terminal 5-k. The user terminal 5-k displays the image indicated by this data. Additionally, this image includes an invoice information display button, which is brought into a one-to-one correspondence with listed data of (b20) and a status date display button, which is brought into a one-to-one correspondence with listed data of (b20).

When the user operates the input device of user terminal 5-k and clicks the invoice information display button, the user terminal 5-k supplies data, indicating with which one of data of (b20) the clicked invoice information display button is associated, to the database management server 3.

The database management server 3 to which this data has been supplied reads data of (b32) to (b44) associated with data of (b20) indicated by this data. After that, the database management server 3 generates data illustrating the status in which information relating to goods specified by data supplied from the user terminal 5-k is transmitted between the parties concerned based on the dates indicated by read data, and supplies generated data to the user terminal 5-k. The user terminal 5-k displays the image indicating this data. FIG. 7 is a view showing this data to be displayed onto the user terminal 5-k.

As illustrated in FIG. 7, the figure representing data includes a diagram indicating the production plant, a diagram indicating the physical distribution center, a diagram indicating the business center, a diagram indicating the customs, a diagram indicating NVOCC (or ship owner), a diagram indicating the shipping port, and a diagram indicating the addressee of goods (client).

Then, for example, if read data of (b32) includes data representing an actual issue date of D/O, this figure further includes an arrow directing from the diagram indicating a production plant to the diagram indicating the business center.

If read data of (b37) includes data representing an actual start-up date of the customs procedure, this figure further includes an arrow directing from the diagram indicating the physical distribution center to the diagram indicating the customs.

If read data of (b36) includes data representing an actual end date of carrying to the shipping port, this figure further includes an arrow directing from the diagram indicating the business center to the diagram indicating the physical distribution center.

If read data of (b38) includes data representing the date which the resultant report of the custom procedure was received, this figure further includes an arrow directing from the diagram indicating the physical distribution center to the diagram indicating NVOCC.

If read data of (b40) includes data representing the actual shipment work executing date, this figure further includes an arrow directing from the diagram indicating the physical distribution center to the diagram indicating the shipping port.

If read data of (b43) includes data representing the actual issue date of B/L, this figure further includes an arrow directing from the diagram indicating NVOCC to the diagram indicating the business center.

If read data of (b44) includes data representing the actual issue date of B/L and the like, this figure further includes an arrow directing from the diagram indicating the business center to the diagram indicating the addressee of goods(client).

When the user operates the input device of user terminal 5-k and clicks the status date display button, the user terminal 5-k supplies data, indicating with which one of data of (b20) the clicked status date display button is associated, to the database management server 3.

The database management server 3 to which this data has been supplied reads data of (b32) to (b44). After that, the database management server 3 generates data representing the image in which read data is listed, and supplies generated data to the user terminal 5-k. The user terminal 5-k displays the image indicated by this data.

In the case where the clicked link destination name is "mortgage information", the database management server 3 determines whether or not the authorization group to which the authenticated user belongs is a combined transport cooperation company user (H), similar to the case in which the clicked link destination name is "P/O and allocation information." Then, when determining that the authorization group is (H), the database management server 3 decides that no display of mortgage display image is performed, and causes the user terminal 5-k to display the selective image. On the other hand, when determining that the authorization group is not (H), the database management server 3 generates data indicating a mortgage search image and causes the user terminal 5-k to display the mortgage search image.

The mortgage search image has a search key entry field, serving as a search key, for inputting an EDP code for goods or goods number and a search button for instructing the database management server 3 to start the search.

Then, the user operates the input device of user terminal 5-k, inputs the EDP code for goods or goods number and clicks the search button. At this time, the user terminal 5-k supplies EDP code for goods or goods number input to the search key entry field to the database management server 3 and instructs the database management server 3 to perform the search.

The database management server 3 that has received this instruction searches the freight tracking information database and specifies data of (b54) (or (b53)) matching the EDP code (or goods number) supplied from the user terminal 5-k. Then, the database management server 3 reads data of (b3), (b4), and (b45) associated with specified data of (b54) (or (b53)). After that, the database management server 3 generates data representing the mortgage display image in which read data is listed every data associated with the same data of (b1), and supplies generated data to the user terminal 5-k. The user terminal 5-k displays the mortgage display image indicated by this data. Additionally, the mortgage display image includes a detail display button, which is brought into a one-to-one correspondence with listed data of (b3).

In this case, if the authorization group of the authenticated user is (F), the following point is not added as data to be listed. Namely, the point is that data of (b45) associated with the corresponding data (b54) (or (b53)) does not indicate the authenticated user in specified data of (b54) (or (b53)) and data associated with this data.

Moreover, if the authorization group of the authenticated user is (G), the following point is not added as data to be listed. Namely, the point is that data of (b3) associated with the corresponding data (b54) (or (b53)) does not indicate the authenticated user in specified data of (b54) (or (b53)) and data associated with this data.

Then, when the user operates the user terminal 5-k and clicks the detail display button, the user terminal 5-k supplies data, indicating with which one of data of (b3) the clicked detail display button is associated, to the database management server 3.

The database management server 3 to which this data has been supplied reads data of (b1), (b5), (b8), (b45) to (b47) and (b49) to (b51) associated with data of (b3) indicated by this data. After that, the database management server 3 generates data representing the image in which read data is listed, and supplies generated data to the user terminal 5-k. The user terminal 5-k displays the image indicated by this data.

In the case where the clicked link destination name is "invoice information", the database management server 3 determines whether or not the authorization group to which the authenticated user belongs is a combined transport cooperation company user (H), similar to the case in which the clicked link destination name is "P/O and allocation information." Then, when determining that the authorization group is (H), the database management server 3 decides that no display of invoice information display image is performed, and causes the user terminal 5-k to display the selective image. On the other hand, when determining that the authorization group is not (H), the database management server 3 generates data indicating an invoice information search image and causes the user terminal 5-k to display the invoice information search image.

The invoice information search image has a search key entry field, serving as a search key, for inputting a scheduled date for shipment work and a search button for instructing the database management server 3 to start the search.

Then, the user operates the user terminal 5-k, inputs the scheduled date for shipment work into the search entry field of the invoice information search image and clicks the search button. At this time, the user terminal 5-k supplies the scheduled date input into the search key entry field to the database management server 3 and instructs the database management server 3 to perform the search.

The database management server 3 that has received this instruction searches the freight tracking information database and specifies data of (b40) matching the scheduled date for shipment work supplied from the user terminal 5-k. Then, the database management server 3 reads data of (b55) associated with specified data of (b40). After that, the database management server 3 generates data representing the invoice information display image mortgage in which read data is listed, and supplies generated data to the user terminal 5-k. The user terminal 5-k displays the invoice information display image indicated by this data. Additionally, the invoice information display image includes an invoice detail display button, which is brought into a one-to-one correspondence with listed data of (b55).

Then, when the user operates the user terminal 5-k and clicks the detail display button, the user terminal 5-k supplies data, indicating with which one of data of (b55) the clicked detail display button is associated, to the database management server 3.

The database management server 3 to which this data has been supplied reads data of (b56) associated with data of (b55) indicated by this data. After that, the database management server 3 generates data representing the image in which read data is displayed, and supplies generated data to the user terminal 5-k. The user terminal 5-k displays the image indicated by this data.

In the case where the clicked link destination name is "stock information", the database management server 3 determines whether or not the authorization group to which the authenticated user belongs is a combined transport cooperation company user (H). Then, when determining that the authorization group is (H), the database management server 3 decides that no display of stock display image is performed, and causes the user terminal 5-k to display the selective image. On the other hand, when determining that the authorization group is not (H), the database management server 3 generates data indicating a stock search image and causes the user terminal 5-k to display the stock search image.

The stock search image has a search key entry field, serving as a search key, for inputting a month when the user wishes to know the stock quantity of goods and a search button for instructing the database management server 3 to start the search.

Then, the user operates the input device of the user terminal 5-k, inputs the month when the user wishes to know the stock quantity of goods into the search key input field of stock search image and clicks the search button. At this time, the user terminal 5-k supplies data representing the month input into the search key entry field to the database management server 3 and instructs the database management server 3 to perform the search.

The database management server 3 that has received this instruction searches the freight tracking information database and specifies data of (d3) matching the month supplied from the user terminal 5-k. Then, the database management server 3 reads specified data of (d3) and data of (d1) and (d3) associated with this data. After that, the database management server 3 generates data representing a stock display image in which read data is listed every data about the same goods, and supplies generated data to the user terminal 5-k. The user terminal 5-k displays the stock display image (for example, an image illustrated in FIG. 8) indicated by this data.

In the case where the clicked link destination name is "goods number information", the database management server 3 determines whether or not the authorization group to which the authenticated user belongs is a combined transport cooperation company user (H). Then, when determining that the authorization group is (H), the database management server 3 decides that no display of goods number display image is performed, and causes the user terminal 5-k to display the selective image. On the other hand, when determining that the authorization group is not (H), the database management server 3 generates data indicating a goods number search image and causes the user terminal 5-k to display the goods number search image.

The goods number search image has a search key entry field, serving as a search key, for inputting a search condition of goods number (for example, range of value where the goods number takes) and a search button for instructing the database management server 3 to start the search.

Then, the user operates the input device of the user terminal 5-k, inputs the search condition into the search key input field of goods search image and clicks the search button. At this time, the user terminal 5-k supplies data representing the search condition into the search key entry field to the database management server 3 and instructs the database management server 3 to perform the search.

The database management server 3 that has received this instruction searches the freight tracking information database and specifies data of (d18) matching the search condition supplied from the user terminal 5-k. Then, the database management server 3 reads specified data of (b18) and data of (b12), (b20), (b22) and (b43) associated with this data. After that, the database management server 3 generates data representing a goods number display image in which read data is listed every data about the same goods, and supplies generated data to the user terminal 5-k. The user terminal 5-k displays the goods number display image indicated by this data.

In the case where the clicked link destination name is "CLP information", the database management server 3 determines whether or not the authorization group to which the authenticated user belongs is a combined transport cooperation company user (H). Then, when determining that the authorization group is (H), the database management server 3 decides that no display of CLP display image is performed, and causes the user terminal 5-k to display the selective image. On the other hand, when determining that the authorization group is not (H), the database management server 3 generates data indicating a CLP search image and causes the user terminal 5-k to display the CLP search image.

The CLP search image has a search key entry field, serving as a search key, for inputting a range of value where the sailing date of a container takes and a search button for instructing the database management server 3 to start the search.

Then, the user operates the input device of the user terminal 5-k, inputs the search condition into the search key input field of CLP search image and clicks the search button. At this time, the user terminal 5-k supplies data representing the search condition into the search key entry field to the database management server 3 and instructs the database management server 3 to perform the search.

The database management server 3 that has received this instruction searches the freight tracking information database and specifies data of (b41) matching the search condition supplied from the user terminal 5-k. Then, the database management server 3 reads specified data of (b41) and data of (b8), (b20), and (b22) to (b24) associated with this data. After that, the database management server 3 generates data representing a CLP display image in which read data is listed every data about the same goods, and supplies generated data to the user terminal 5-k. The user terminal 5-k displays the CLP display image indicated by this data. Additionally, the CLP display image includes a display button by case, which is brought into a one-to-one correspondence with listed data of (b22).

In this case, if the authorization group of the authenticated user is (F), the following point is not added as data to be listed. Namely, the point is that data of (b45) associated with the corresponding data does not indicate the authenticated user in specified data of (b41) and data associated with this data.

Moreover, if the authorization group of the authenticated user is (G), the following point is not added as data to be listed. Namely, the point is that data of (b3) associated with the corresponding data does not indicate the authenticated user in specified data of (b41) and data associated with this data.

Then, when the user operates the user terminal 5-k and clicks the display button by case, the user terminal 5-k supplies data, indicating with which one of data of (b20) the clicked display button by case is associated, to the database management server 3.

The database management server 3 to which this data has been supplied reads data of (b25) to (b27) associated with data of (b22) indicated by this data. After that, the database management server 3 generates data representing the image in which read data is listed every data about the same case, and supplies generated data to the user terminal 5-k. The user terminal 5-k displays the image indicated by this data.

In the case where the clicked link destination name is "Shipping Advice information", the database management server 3 determines whether or not the authorization group to which the authenticated user belongs is a combined transport cooperation company user (H). Then, when determining that the authorization group is (H), the database management server 3 decides that no display of shipping advice information display image is performed, and causes the user terminal 5-k to display the selective image. On the other hand, when determining that the authorization group is not (H), the database management server 3 generates data indicating a shipping advice information search image and causes the user terminal 5-k to display the CLP search image.

The shipping advice information search image has a search key entry field, serving as a search key, for inputting a range of issue date of B/L and a search button for instructing the database management server 3 to start the search.

Then, the user operates the user terminal 5-k, inputs the range of issue date of BL into the search key input field of shipping advice information search image and clicks the search button. At this time, the user terminal 5-k supplies data representing the search condition into the search key entry field to the database management server 3 and instructs the database management server 3 to perform the search.

The database management server 3 that has received this instruction searches the freight tracking information database and specifies data of (b43) in which the issue date of B/L is included in the range indicated by data supplied from the user terminal 5-k. Then, the database management server 3 reads specified data of (b28), (b8), (b13), (b46) and (b40) associated with specified data of (b43). After that, the database management server 3 generates data representing a shipping advice information display image in which read data is listed every data about the same B/L, and supplies generated data to the user terminal 5-k. The user terminal 5-k displays the shipping advice information display image indicated by this data.

Additionally, the shipping advice information display image includes a B/L detail display button, which is brought into a one-to-one correspondence with listed data of (b28), and a shipping advice detail display button, which is brought into a one-to-one correspondence with listed data of (b28).

In this case, if the authorization group of the authenticated user is (F), the following point is not added as data to be listed. Namely, the point is that data of (b45) associated with the corresponding data does not indicate the authenticated user in specified data of (b43) and data associated with this data.

Moreover, if the authorization group of the authenticated user is (G), the following point is not added as data to be listed. Namely, the point is that data of (b3) associated with the corresponding data does not indicate the authenticated user in specified data of (b43) and data associated with this data.

Then, when the user operates the user terminal 5-k and clicks the B/L detail display button, the user terminal 5-k supplies data, indicating with which one of data of (b28) the clicked B/L detail display button is associated, to the database management server 3.

The database management server 3 to which this data has been supplied reads data of (b29) associated with data of (b28) indicated by this data. After that, the database management server 3 generates data representing the image that displays read data, and supplies generated data to the user terminal 5-k. The user terminal 5-k displays the image indicated by this data.

Then, when the user operates the user terminal 5-k and clicks the shipping advice detail display button, the user terminal 5-k supplies data, indicating with which one of data of (b28) the clicked the shipping advice detail display button is associated, to the database management server 3.

The database management server 3 to which this data has been supplied reads data of (b31) associated with data of (b28) indicated by this data. After that, the database management server 3 generates data representing the image that displays read data, and supplies generated data to the user terminal 5-k. The user terminal 5-k displays the image indicated by this data.

In the case where the clicked link destination name is "CFM information", the database management server 3 determines whether or not the authorization group to which the authenticated user belongs is a combined transport cooperation company user (H). Then, when determining that the authorization group is (H), the database management server 3 decides that no display of CFM display image is performed, and causes the user terminal 5-k to display the selective image. On the other hand, when determining that the authorization group is not (H), the database management server 3 generates data indicating a CFM search image and causes the user terminal 5-k to display the CFM search image.

The CFM search image has a search key entry field, serving as a search key, for inputting a search condition of CFM (a range of value where date of arrival in port of a container takes) and a search button for instructing the database management server 3 to start the search.

Then, the user operates the input device of user terminal 5-k, inputs the search condition into the search key input field of CFM search image and clicks the search button. At this time, the user terminal 5-k supplies data representing the search condition into the search key entry field to the database management server 3 and instructs the database management server 3 to perform the search.

The database management server 3 that has received this instruction searches the freight tracking information database and specifies data of (b42) matching the search condition supplied from the user terminal 5-k. Then, the database management server 3 reads specified data of (b42), and data of (b22), (b41) and (b43) associated with this data. After that, the database management server 3 generates data representing a CFM display image in which read data is listed every data about the same container, and supplies generated data to the user terminal 5-k. The user terminal 5-k displays the CFM display image indicated by this data. Additionally, the CFM display image includes a display button by case, which is brought into a one-to-one correspondence with listed data of (b22).

In this case, if the authorization group of the authenticated user is (F), the following point is not added as data to be listed. Namely, the point is that data of (b45) associated with the corresponding data does not indicate the authenticated user in specified data of (b42) and data associated with this data.

Moreover, if the authorization group of the authenticated user is (G), the following point is not added as data to be listed. Namely, the point is that data of (b3) associated with the corresponding data does not indicate the authenticated user in specified data of (b42) and data associated with this data.

Then, when the user operates the user terminal 5-k and clicks the display button by case, the user terminal 5-k supplies data, indicating with which one of data of (b22) the clicked display button by case is associated, to the database management server 3.

The database management server 3 to which this data has been supplied reads data of (b25) to (b27) associated with data of (b22) indicated by this data and data of (b5). After that, the database management server 3 generates data representing the image in which read data is listed every data about the case, and supplies generated data to the user terminal 5-k. The user terminal 5-k displays the image indicated by this data.

In the case where the clicked link destination name is "customs document", the database management server 3 determines whether or not the authorization group to which the authenticated user belongs is an in-company general user (E). Then, when determining that the authorization group is (E), the database management server 3 decides that no display of customs document display image is performed, and causes the user terminal 5-k to display the selective image. On the other hand, when determining that the authorization group is not (E), the database management server 3 generates data representing a customs document link image and causes the user terminal 5-k to display the customs document link image.

The customs document link image is an image that lists the names of the foregoing data (a8), and a hyperlink to data of (a8) having the corresponding name is provided to each name.

In the case where the clicked link destination name is "overseas shipment document", the database management server 3 determines whether the authorization group to which the authenticated user belongs is a combined transport business user (D) or an in-company general user (E). Then, when determining that the authorization group is (D) or (E), the database management server 3 decides that no display of overseas shipment document display image is performed, and causes the user terminal 5-k to display the selective image. On the other hand, when determining that the authorization group is neither (D) nor (E), the database management server 3 generates data representing an overseas shipment document link image and causes the user terminal 5-k to display the overseas shipment document link image.

The overseas shipment document link image is an image that lists the names of the foregoing data (a1) or (a4), and a hyperlink to data of (a1) or (a4) having the corresponding name is provided to each name.

In the case where the clicked link destination name is "combined transport document", the database management server 3 determines whether the authorization group to which the authenticated user belongs is an export business user (C) or an in-company general user (E). Then, when determining that the authorization group is (C) or (E), the database management server 3 decides that no display of combined transport document display image is performed, and causes the user terminal 5-k to display the selective image. On the other hand, when determining that the authorization group is neither (C) nor (E), the database management server 3 generates data representing a combined transport document link image and causes the user terminal 5-k to display the combined transport document link image.

The combined transport document link image is an image that lists the names of the foregoing data (a2), (a3), (a5) to (a7) and (a9) to (a15), and a hyperlink to data of (a2), (a3), (a5) to (a7) and (a9) to (a15) each having the corresponding name is provided to each name.

It should be noted that the structure of the freight tracking information management system is not limited to the aforementioned case.

For example, the same server computer may perform the functions of the database management server 3 and the key business server 1-j, and the user terminal 5-k may perform the functions of the database management terminal 4. Also, the key business terminal 2-j may perform the functions of the database management terminal 4. Moreover, the scanner S may be connected to the key business terminal 2-j.

Still moreover, this freight tracking information management system may be used to perform the registration of data of the document relating to the import procedure of goods, the search thereof, or the viewing thereof.

Still moreover, this freight tracking information management system may provide an electronic watermark or a digital signature to PDF-formatted image data generated by this system. The provision of the electronic watermark or the digital signature to PDF-formatted image data prevents this image data from being tampered more reliably.

However, even if image data representing the document is tampered, there is no occurrence in which the description matters of the document are illegally changed since image data is not the original of the document. There is a method in which image data is used in place of the original in advancing the procedures of imports and exports. Accordingly, this method itself can also play a role in preventing the danger that the original is tampered in the process in which the procedure advances.

There is a contract in which the PDF-formatted image data that is generated by this freight tracking information management system is handled as substantially identical with the original of the document representing the corresponding image data. This contract may be concluded between the users of the freight tracking information management system. Moreover, there is a contract in which the manager of the freight tracking information management system guarantees the identity of the description contents represented by the corresponding PDF-formatted image data and those of the original of the document represented by the corresponding image data. This contract may be concluded between the manager of the freight tracking information management system and the user.

Though the above explained the embodiment of the present invention, the physical distribution management system according to the present invention may be implemented using the general computer system instead of the dedicated system.

For example, from a storage medium (CD-ROM, magnetic tape, and the like) that stores the programs for executing the operations of the foregoing key business server 1-j, key business terminal 2-j, database management server 3, database management terminal 4 and user terminal 5-j, the corresponding program is installed on a plurality of computers each having DSU and a terminal adopter and connected to each other. This makes it possible to construct the freight tracking information management system that executes the aforementioned processing.

Moreover, for example, the corresponding program of a communications line is posted on a bulletin board system (BBS) and this may be distributed via the communications line. Still moreover, a carrier wave is modulated by a signal representing the corresponding program and an obtained modulation wave is transmitted. Then, the device that has received this modulation wave may demodulate the modulation wave to restore the corresponding program.

After that, this program is started up and executes it under control of OS, similar to the other application programs, making is possible to execute the aforementioned processing.

Additionally, in the case where OS shares a part of processing or OS constitutes a part of one component of the present invention, a program excluding such a part may be stored to a storage medium. In this case, according to the present invention, it is assumed that programs for executing the programs that execute the respective functions executed by the computer or the steps are stored in the storage medium.

As explained above, according to the present invention, there can be implemented a physical distribution business management method that makes it easy to grasp the progress of the procedure relating to the transport of goods, and a physical distribution business management system.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2000-387958 filed on Dec. 20, 2000 and including specification, claims, drawings and summary. The disclosure of the above Japanese Patent Application is incorporated herein by reference in its entirety.

What is claimed is:

1. A physical distribution business management method, comprising:
    an image data generation step for generating image data of a document on which a condition for exporting or importing goods is described, said image data generation step generating said image data upon reception of said document obtained as a result of execution of a physical distribution step;

an image data storage step for storing the image data generated in said image data generation step to be associated with said goods to a freight tracking information database, upon generation of said image data;

a document data storage step for storing document data described on said document to said freight tracking information database in association with said goods, upon generation of said image data, said document data including date data representing an execution date of the physical distribution step related to said document;

an identification data storage step for storing identification data that identifies a party concerned with export or import of said goods among, in addition to a consignor and a consignee, a number of parties concerned with export or import of said goods; and a data output step, when said party concerned specifies data relating to goods, for obtaining image data and document data, in said freight tracking information database, and for outputting said obtained data, wherein said identification data storage step decides a range of the image and document data to said party concerned based on the stored identification data, and said data output step obtains data matching said decided range;

wherein said data output step includes the steps of, based on said decided range and said specified data relating to the goods, obtaining image data of an associated one or a plurality of documents, and outputting said image data and said document data to a terminal of said concerned party to thereby display a status of a transfer of said goods, on said terminal of said concerned party; and wherein said data output step further comprises displaying, on a display device of the terminal based on said obtained data, a diagram illustrating the status of the transfer of said goods, wherein the step of displaying the diagram includes displaying a plurality of images, each image representing a physical location used in the transfer of said goods; and displaying an arrow between two images in said diagram when the date data in the obtained document data indicates that a physical distribution step involving the physical locations corresponding to the two images has been completed, and repeating the step of displaying an arrow for all of the date data in the obtained document data to thereby display a current and historical status of the transfer of the goods.

2. The physical distribution business management method according to claim 1, wherein said data output step specifies a completed procedure of said procedures based on said date data, and outputs data representing the specified completed procedure.

3. The physical distribution business management method according to claim 2, wherein said document data storage step displays image data stored in said image data storage step and stores document data from the document displayed in said image data.

4. The physical distribution business management method according to claim 3, wherein said image data generation step reads an image of a face of said document and generates said image data representing said read image, and said image data storage step obtains said generated image data and stores said obtained image data to be associated with the corresponding goods.

5. The physical distribution business management method according to claim 2, wherein said document data storage step displays image data stored in said image data storage step and stores document data from the document displayed in said image data.

6. The physical distribution business management method according to claim 5, wherein said image data generation step reads an image of a face of said document and generates said image data representing said read image, and said image data storage step obtains said generated image data and stores said obtained image data to be associated with the corresponding goods.

7. The physical distribution business management method according to claim 1, wherein said document data storage step displays image data stored in said image data storage step and stores document data from the document displayed in said image data.

8. The physical distribution business management method according to claim 7, wherein said image data generation step reads an image of a face of said document and generates said image data representing said read image, and said image data storage step obtains said generated image data and stores said obtained image data to be associated with the corresponding goods.

9. The method of claim 1, wherein the plurality of images in said diagram includes at least one of an image of a production plant, an image of a shipping port, an image of an unloading port, and an image of a client.

10. A physical distribution business management system, comprising:

image data generation means for generating image data of a document on which a condition for exporting or importing goods is described, said image data generation means generating said image data upon reception of said document obtained as a result of execution of a physical distribution step;

image data storage means for storing the image data generated by said image data generation means to be associated with said goods to a freight tracking information database, upon generation of said image data;

document data storage means for storing document data described on said document to said freight tracking information database in association with said goods, upon generation of said image data, said document data including date data representing an execution date of the physical distribution step related to said document;

identification data storage means for storing identification data that identifies a party concerned with export or import of said goods among, in addition to a consignor and a consignee, a number of parties concerned with export or import of said goods; and data output means, when said party concerned specifies data relating to goods, for obtaining image data and document data, in said freight tracking information database, and for outputting said obtained data, wherein said identification data storage means decides a range of the image and document data to said party concerned based on the stored identification data, and said data output means obtains data matching said decided range;

wherein said data output means includes, based on said decided range and said specified data relating to the goods, means for obtaining image data of an associated one or a plurality of documents, and means for outputting said image data said document data to a terminal of said concerned party to thereby display a status of a transfer of said goods, on said terminal of said concerned part; and wherein said data output means displays, on a display device of the terminal based on said obtained data, a diagram illustrating the status of the transfer of said goods, wherein the data output means displays a plurality of images, each image representing a physical location used in the transfer of said goods; and displays an arrow between two images in said diagram when the date data in the obtained document data indicates that a physical distribution step involving the physical locations corresponding to the two images has been completed, and repeats displaying an arrow for all of the date data in the obtained document data to thereby display a current and historical status of the transfer of the goods.

11. The physical distribution business management system according to claim 10, wherein said data output means specifies a completed procedure of said procedures based on said date data, and outputs data representing the specified completed procedure.

12. The physical distribution business management system according to claim 11, wherein said document data storage means displays image data stored in said image data storage means and stores document data from the document displayed in said image data.

13. The physical distribution business management system according to claim 12, wherein said image data generation means reads an image of a face of said document and generates said image data representing said read image, and said image data storage means obtains said generated image data and stores said obtained image data to be associated with the corresponding goods.

14. The physical distribution business management system according to claim 11, wherein said document data storage means displays image data stored in said image data storage means and stores document data from the document displayed in said image data.

15. The physical distribution business management system according to claim 14, wherein said image data generation means reads an image of a face of said document and generates said image data representing said read image, and said image data storage means obtains said generated image data and stores said obtained image data to be associated with the corresponding goods.

16. The physical distribution business management system according to claim 10, wherein said document data storage means displays image data stored by said image data storage means and stores document data from the document displayed in said image data.

17. The physical distribution business management system according to claim 16, wherein said image data generation means reads an image of a face of said document and generates said image data representing said read image, and said image data storage means obtains said generated image data and stores said obtained image data to be associated with the corresponding goods.

18. A computer-readable storage medium having a computer-program recorded thereon, said computer program causing a computer to perform the steps of:

generating image data of a document on which a condition for exporting or importing goods is described, said image data generation step generating said image data upon reception of said document obtained as a result of execution of a physical distribution step;

storing image data generated in said image data generation step to be associated with said goods to a freight tracking information database, upon generation of said image data;

storing document data described on said document to said freight tracking information database in association with said goods, upon generation of said image data, said document data including date data representing an execution date of the physical distribution step related to said document;

storing identification data that identifies a party concerned with export or import of said goods among, in addition to a consignor and a consignee, a number of parties concerned with export or import of said goods, to decide a range of an output enable data to said party concerned based on stored identification data; and when said party concerned specifies data relating to goods, obtaining image data and document data, in said freight tracking information database which matches said decided range, and outputting said obtained data, wherein said data output step includes the steps of, based on said decided range and said specified data relating to the goods, obtaining image data of an associated one or a plurality of documents, and outputting said image data and said document data to a terminal of said concerned party to thereby display a status of a transfer of said goods, on said terminal of said concerned party; and wherein said data output step further comprises displaying, on a display device of the terminal based on said obtained data, a diagram illustrating the status of the transfer of said goods, wherein the step of displaying the diagram includes displaying a plurality of images, each image representing a physical location used in the transfer of said goods; and displaying an arrow between two images in said diagram when the date data in the obtained document data indicates that a physical distribution step involving the physical locations corresponding to the two images has been completed, and repeating the step of displaying an arrow for all of the date data in the obtained document data to thereby display a current and historical status of the transfer of the goods.

19. A physical distribution business management method, comprising:

an identification data storage step for storing identification data that identifies a party concerned with export or import of goods, wherein, in addition to a consignor and consignee, a number of parties are concerned with exporting or importing goods;

an image data generation step for generating image data of a document, that is used in a procedure for the delivery of goods between respective parties concerned, on which a condition for exporting or importing goods is described, said image data generation step generating said image data upon reception of said document obtained as a result of execution of a physical distribution step;

an image data storage step for storing image data, generated in said image data generation step, to be associated with said goods to a freight tracking information database, upon generation of said image database;

a document data storage step for storing document data, described on said document to said freight tracking information database in association with said goods, upon generation of said image data, said document data including date data representing an execution date of the physical distribution step related to said document; and a data output step, when said party concerned specifies data relating to the goods, for obtaining image data and document data, in said freight tracking information database, and outputting said obtained data, wherein said identification data storage step decides a range of the image and document data to said party concerned based on the stored identification data, and said data output step obtains data matching said decided range, wherein said data output step includes the steps of, based on said decided range and said specified data relating to the goods, obtaining image data of an associated one or a plurality of documents, and outputting said image data and said document data to a terminal of said concerned party to thereby display a status of a transfer of said goods, on said terminal of said concerned party; and wherein said data output step further comprises displaying, on a display device of the terminal based on said obtained data, a diagram illustrating the status of the transfer of said goods, wherein the step of displaying the diagram includes displaying a plurality of images, each image representing a physical location used in the transfer of said goods; and displaying an arrow between two images in said diagram when the date data in the obtained document data indicates that a physical distribution step involving the physical locations corresponding to the two images has been completed, and repeating the step of displaying an arrow for all of the date data in the obtained document data to thereby display a current and historical status of the transfer of the goods.

20. A physical distribution business management system, comprising:

an image data generation unit configured to generate image data of a document on which a condition for exporting or importing goods is described, said image data generation unit configured to generate said image data upon reception of said document obtained as a result of execution of a physical distribution step;

an image data storage unit configured to store image data, generated by said image data generation unit, to be associated with said goods to a freight tracking information, database upon generation of said image database;

a document data storage unit configured to document data, described on said document to said freight tracking information database in association with said goods, upon generation of said image data, the document data including date data representing an execution date of the physical distribution step related to said document;

an identification data storage unit configured to store identification data that identifies a party concerned with export or import of said goods, wherein, in addition to a consignor and consignee, a number of parties are concerned with exporting or importing goods; and a data output unit which, when said party concerned specifies data relating to the goods, is configured to obtain image data and document data, in said freight tracking information database, and to output said obtained data, wherein said identification data storage unit is configured to decide a range of the image and document data to said party concerned based on stored identification data, and said data output unit is configured to obtain data matching said decided range;

wherein said data output unit is configured to, based on said decided range and said specified data relating to the goods, obtain image data of an associated one or a plurality of documents, and output said image data and said document data to a terminal of said concerned party to thereby display a status of a transfer of said goods, on said terminal of said concerned party; and wherein said data output unit is configured to display, on a display device of the terminal based on said obtained data, a diagram illustrating the status of the transfer of said goods, wherein the data output unit is configured to display a plurality of images, each image representing a physical location used in the transfer of said goods; and to display an arrow between two images in said diagram when the date data in the obtained document data indicates that a physical distribution step involving the physical locations corresponding to the two images has been completed, and to repeat the display of an arrow for all of the date data in the obtained document data to thereby display a current and historical status of the transfer of the goods.

21. A physical distribution business management system, comprising:

an identification data storage unit configured to store identification data that identifies a party concerned with export or import of goods, wherein, in addition to a consignor and consignee, a number of parties are concerned with exporting or importing goods;

a image data generation unit configured to generate image data of a document, which is used in a procedure for delivery of goods between respective parties concerned, on which a condition for exporting or importing goods is described, said image data generation unit configured to generate said image data upon reception of said documents obtained as a result of execution of a physical distribution step;

an image data storage unit configured to store image data, generated by said image data generation unit, to be associated with said goods to a freight tracking information database, upon generation of said image data;

a document data storage unit configured to store document data, described on said document to said freight tracking information database in association with said goods, upon generation of said image data, the document data including date data representing an execution date of the physical distribution step related to said document; and a data output unit, when said party concerned species data relating to goods, is configured to obtain image data and document data, in said freight tracking information database, and to output said obtained data, wherein said identification data storage unit is configured to decide a range of the document and image data to said party concerned based on stored identification data, and said data output unit is configured to obtain data matching said decided range;

wherein said data output unit is configured to, based on said decided range and said specified data relating to the goods, obtain image data of an associated one or a plurality of documents, and output said image data and said document data to a terminal of said concerned party to thereby display a status of a transfer of said goods, on said terminal of said concerned party; and wherein said data output unit is configured to display, on a display device of the terminal based on said obtained data, a diagram illustrating the status of the transfer of said goods, wherein the data output unit is configured to display a plurality of images, each image representing a physical location used in the transfer of said goods; and to display an arrow between two images in said diagram when the date data in the obtained document data indicates that a physical distribution step involving the physical locations corresponding to the two images has been completed, and to repeat the display of an arrow for all of the date data in the obtained document data to thereby display a current and historical status of the transfer of the goods.

* * * * *